US006892602B2

(12) United States Patent
Hirschfeld et al.

(10) Patent No.: US 6,892,602 B2
(45) Date of Patent: May 17, 2005

(54) DEVICE FOR FASTENING A CASING TUBE SWITCH MODULE TO THE CASING TUBE OF A MOTOR VEHICLE STEERING SHAFT

(75) Inventors: Klaus Hirschfeld, Ludenscheid (DE); Holger Lettmann, Plettenberg (DE); Christoph Oster, Ludenscheid (DE); Dietmar Kritzler, Ludenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 223 days.

(21) Appl. No.: 10/328,628

(22) Filed: Dec. 23, 2002

(65) Prior Publication Data

US 2004/0055408 A1 Mar. 25, 2004

(30) Foreign Application Priority Data

Sep. 24, 2002 (DE) .......................... 102 44 245

(51) Int. Cl.⁷ .............................................. B60R 16/02
(52) U.S. Cl. ....................................... 74/484 R; 74/492
(58) Field of Search .............................. 74/484 R, 492, 74/552; 280/779; 403/1, 203, 309, 314, 319, 409.1

(56) References Cited

U.S. PATENT DOCUMENTS 3,877,319 A * 4/1975 Cooper ........................ 74/492
4,850,239 A * 7/1989 Oosterwal .................... 74/493
5,002,422 A * 3/1991 Schremmer et al. ...... 403/359.5
5,722,300 A * 3/1998 Burkhard et al. ............ 74/493
6,151,980 A * 11/2000 Nishitani et al. ......... 74/484 R
6,318,756 B1 * 11/2001 Papandreou ................ 280/775

FOREIGN PATENT DOCUMENTS

| DE | 199 42 247 C1 | 9/1999 |
|---|---|---|
| DE | 199 42 818 A1 | 9/1999 |

* cited by examiner

Primary Examiner—David A. Bucci
Assistant Examiner—Timothy McAnulty
(74) Attorney, Agent, or Firm—Brooks Kushman P.C.

(57) ABSTRACT

A device for fastening a casing tube switch module to a casing tube of a steering wheel shaft when a steering wheel is mounted on the steering shaft. The device including a clamping element and a bearing. The clamping element is arranged coaxially between the casing tube and the switch module. The clamping element exerts a clamping force in a direction extending radially out from the steering shaft. The bearing rotationally decouples the steering wheel from the switch module. The bearing has a stator operable for transferring an axial motion of the steering wheel as the steering wheel is mounted on the steering shaft to the switch module such that the switch module moves axially with respect to the casing tube toward the clamping element and tensions the clamping element to apply the clamping force to fasten the switch module to the casing tube.

13 Claims, 2 Drawing Sheets

DEVICE FOR FASTENING A CASING TUBE SWITCH MODULE TO THE CASING TUBE OF A MOTOR VEHICLE STEERING SHAFT

BACKGROUND OF THE INVENTION

1. Field of the Invention

The invention concerns a device to fasten a casing tube switch module to the casing tube of a motor vehicle steering shaft.

2. Background Art

Casing tube switch modules are switch modules that are arranged in the area of the casing tube of a motor vehicle steering shaft. These modules carry, for example, steering column switches and similar things. Depending on the embodiment, part of the casing tube switch module can also be a contact coil cassette, an angular position sensor, or something similar.

As a rule, the casing tube switch module is arranged so that it is concentric to the casing tube of the steering shaft and is fastened to it. Such a casing tube switch module can—as provided in DE 199 42 247 C1—be fastened with a stiffening module and coupling module which is rigidly connected with the casing tube. This module includes connection elements to which the casing tube switch module can be fastened by a stable clip connection, for example. The object of this document provides that, to create the entire steering column module, first the casing tube switch module is fastened to the casing tube and then the steering wheel is mounted onto the end of the steering shaft that reaches through the casing tube switch module.

In other embodiments, the casing tube switch module is held to the casing tube by pipe clamps or means of axial attachment.

DE 199 42 818 A1 discloses another casing tube switch module which, in contrast to the previously described prior art, is fastened not to the casing tube but rather to the steering wheel. This casing tube switch module is rotationally decoupled from the steering wheel itself. To make sure there is no twisting, the casing tube switch module is held torsionally fixed to the casing tube, for example by putting it on a peg. An advantage of this embodiment is that no tolerances have to be compensated at the interface of the steering wheel and the casing tube switch module. The consequence of this is that a motion gap between the steering wheel and the casing tube switch module is regularly equal, independent of the tolerances that arise. Another advantage of the object of this document is that the casing tube switch module does not require additional measures to mount it on the casing tube.

However, it has turned out that it is preferable to use casing tube switch modules which are fastened directly to the casing tube. Nevertheless, it is also desired to fasten such a casing tube switch module to the casing tube without additional measures when the steering wheel is put on or fastened to the steering shaft.

SUMMARY OF THE INVENTION

Therefore, the invention is based on the task of making available such a device for fixing the casing tube switch module to the casing tube. This task is solved according to the invention by the fact that the device includes a clamping element which is arranged coaxially between the casing tube and the casing tube switch module and which exerts a clamping force in the radial direction, and a bearing which rotationally decouples the steering wheel from the casing tube switch module, with the stator side of the bearing transferring a clamping force onto the clamping element by making a relative motion between the casing tube switch module and the casing tube, so that this relative motion pretensions the clamping element to apply the clamping force.

The device has a clamping element located in a radial or in a radially acting arrangement between the casing tube and the casing tube switch module or a bracket associated with the casing tube switch module. The clamping element, which in theory can also be a clamping element arrangement having several elements, clamps the casing tube switch module with radial clamping forces. To apply the desired clamping force to clamp the clamping element between the casing tube and the casing tube switch module, the entire casing tube switch module is moved in the axial direction relative to the casing tube. When this motion is made to fix the casing tube switch module against the clamping element, which in turn is supported against the outside of the casing tube switch module, the stator side of the bearing against whose rotor side of the steering wheel or the steering wheel hub lies, acts directly or indirectly on the casing tube switch module.

Thus, in theory the object of this device does not have any tolerance compensation elements between the steering wheel and the casing tube switch module, so that the gap between the steering wheel and the casing tube switch module is equally wide, independent of difference tolerances that arise. In the object of this device, the tolerance compensation occurs in the lower area of the casing tube switch module pointing away from the steering wheel. The radial arrangement of the clamping element between the casing tube switch module and the casing tube with its clamping force acting in the radial direction makes it possible to provide both the necessary axial fastening and provides the necessary security against twisting.

Since in the described device the clamping element is pretensioned by a relative axial motion between the casing tube and the casing tube switch module, the casing tube switch module is fixed by the wedging of the elements with one another. Thus, achieving the desired clamping force requires only a small clamping gap between the casing tube switch module and the casing tube, in which the clamping element is arranged.

The axial motion between the casing tube switch module and the casing tube that is necessary to pretension the clamping element results from the steering wheel's axial motion that is transferred through the bearing when the steering wheel is mounted by tightly screwing it to the free end of the steering shaft. Thus, the casing tube switch module is fixed to the casing tube when the steering wheel is put on. In this connection, the casing tube switch module can be pushed onto the free end of the steering column at the same time as the steering wheel and fixed against the casing tube by tightening the steering wheel bolt.

It can also be provided that the casing tube switch module is first put onto the free end of the steering column, and that the casing tube switch module is not actually fixed to the casing tube until the steering wheel is fastened to the free end of the steering shaft. This can be useful if other assembly steps should be performed between the step of putting the casing tube switch module on and the step of fastening the steering wheel on the free end of the steering shaft.

In an expedient embodiment, the clamping element is a sleeve-shaped clamping part which is arranged so that it is concentric to the casing tube and which has at least two clamping tongues that are separated from one another by slits. It is expedient for the clamping tongues to have a curvature that is concentric to the casing tube, and for this reason they are relatively stiff, however they can be elastically deformed when a radial force is applied, so that such clamping tongues can apply a very strong clamping force. The clamping tongues are made so that they can be supported on the outside of the casing tube, on the one hand, and on the inside of the casing tube switch module, on the other hand. The two clamping areas are spaced apart from one another in the axial direction, with it being expedient for the lower free end to flare outward so as to form the support area against the inside of the casing tube switch module. Thus, this outward-flaring section of the clamping tongues acts as a run-up bevel, which, when the casing tube switch module moves in the axial direction relative to the casing tube, produces the desired pretension on the clamping tongues as a consequence of their support against the surface of the casing tube.

In order that, when this axial motion occurs, the clamping element is held stationary relative to the casing tube switch module in the direction of motion, a stop holds the clamping element stationary relative to the casing tube switch module in the direction in which it is mounted. Such a stop can be formed, for example, by the clamping part having a stop flange that projects radially inward and is supported against the face of the casing tube pointing toward the steering wheel.

It is easy to loosen the fastening device again from the casing tube, without wear being evident on the clamping element when the casing tube switch module is mounted or removed. To accomplish this, the casing tube switch module is pulled off of the clamping element in the direction opposite that in which it was mounted. To assist such detachment, it can be expedient to provide a compression spring supporting this motion. One end of it is supported against an abutment of the clamping element, formed by a flange, for example, and it is also supported against the casing tube switch module. When the casing tube switch module is assembled, the compression spring is pretensioned, so that when disassembly and removal of the steering wheel from the steering shaft is desired, the spring tries to release its tension, which pushes the casing tube switch module off of the clamping element.

A further development provides that the clamping element or the clamping part has a bulge or cam that faces toward the surface of the casing tube and that allows tactile assembly by engaging into an opening in the casing tube, which shows an assembler the correct assembly position.

Another embodiment of the invention provides the necessary radial clamping force by using one or more deformable rings as clamping element(s); it is expedient for them to be elastically deformable. In this embodiment the axial tensioning motion is converted into the desired radial clamping force by the deformation of these rings. In another embodiment, the axial motion that is exerted when the steering wheel is mounted and that is transferred to the casing tube switch module is redirected into a radial clamping force by a clamping element in the form of an arrangement of balls, for example with the balls serving as abutments to flare out clamping extensions or perhaps that the balls themselves are directly pushed out by a flaring bevel when such an axial motion occurs.

BRIEF DESCRIPTION OF THE DRAWINGS

The invention will be described below on the basis of a preferred embodiment with reference to the attached Figures. The Figures are as follows.

DETAILED DESCRIPTION OF THE PREFERRED EMBODIMENT(S)

Figure 1:
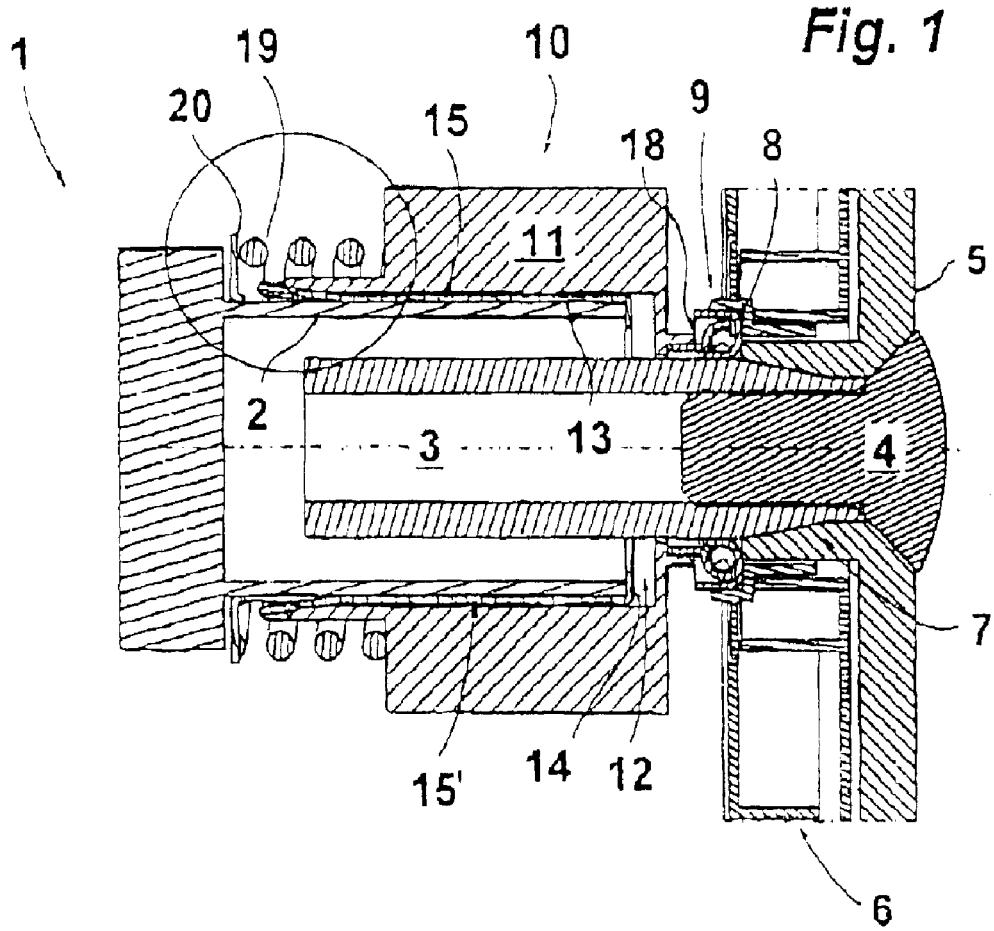
FIG. 1: a longitudinal section through the top end of a steering column module with a casing tube switch module.

A motor vehicle steering column module, which is referred to in its entirety with reference number 1, includes a steering shaft 3 mounted in a casing tube 2 so that it can rotate. The free end of steering shaft 3 has a steering wheel fastened to it by a steering wheel bolt 4; FIG. 1 shows only steering wheel hub 5. In the sample embodiment shown part of the steering wheel is a contact coil cassette 6. Steering wheel hub 5 has a mounting sleeve 7 into which the free end of steering shaft 3 is inserted. The free face of mounting sleeve 7 lies against a rotor side 8 of a bearing 9. Bearing 9 is arranged so that it is concentric to steering shaft 3.

Steering column module 1 also includes a casing tube switch module 10 of which only bracket 11 is shown in FIG. 1. Bracket 11 of casing tube switch module 10 concentrically surrounds casing tube 2 in the area of its top end. To do this, bracket 11 surrounds a socket-shaped receptacle 12, into which the free end of casing tube 2 engages. The inside diameter of receptacle 12 is greater than the diameter of casing tube 2 in the area of its section that extends into receptacle 12 leaving a gap. This gap is provided so that a sleeve-shaped clamping part 13 can be arranged between casing tube 2 and bracket 11 of casing tube switch module 10.

Clamping part 13 concentrically surrounds casing tube 2 and has, on its end facing the steering wheel or the steering wheel hub 5, a stop flange 14 that projects radially inward. This stop flange 14 is supported on the face of casing tube 2 pointing toward steering wheel hub 5.

Figure 2:
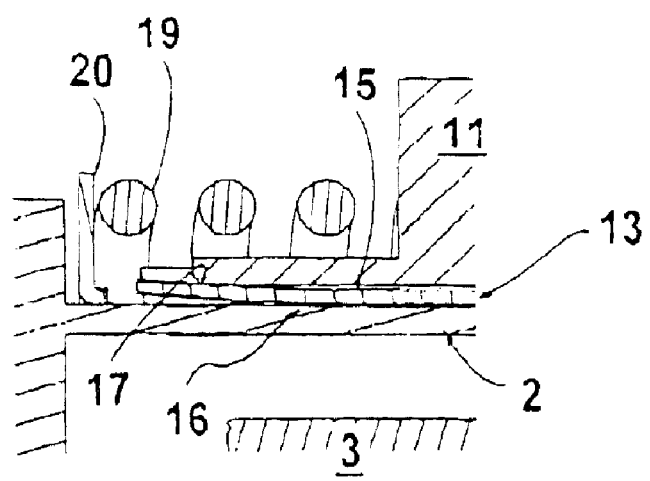
FIG. 2: an enlarged representation of the section shown in FIG. 1.
Figure 3:
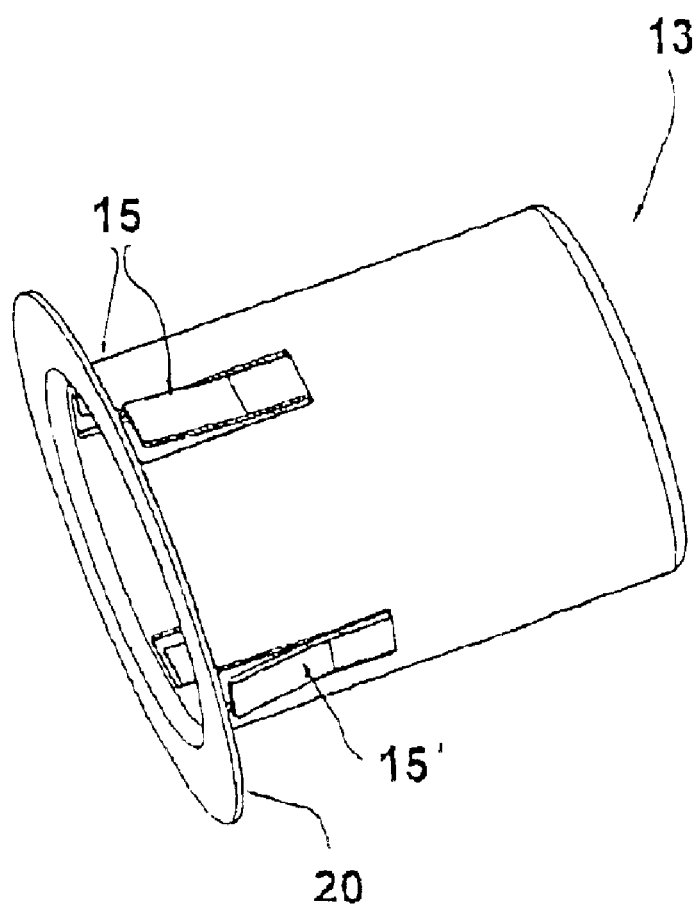
FIG. 3: a view of a clamping part to fasten the casing tube switch module.

Clamping part 13 is slit several times in the axial direction to form several clamping tongues 15, 15' (shown best in FIG. 3). The clamping tongues, two of which 15, 15' can be seen in FIG. 1, provide a radial clamping force to fix bracket 11 of casing tube switch module 10 against casing tube 2. The clamping is explained with reference to the enlarged illustration of the end section of clamping tongue 15 in FIG. 2. Clamping tongue 15 of clamping part 13 flares radially outward at its end pointing away from steering wheel hub 5. Since clamping part 13 is sleeve-shaped, clamping tongue 15 is curved in the circumferential direction.

The flaring of clamping tongue 15 forms two clamping areas which are marked in FIG. 2 with reference numbers 16, 17. Clamping area 16 is formed by bending clamping tongue 15 to make it flare and it lies against the surface of casing tube 2. The other clamping area 17 is formed by the outside of clamping tongue 15 lying against the inside of bracket 11 in the area of its front face that points away from steering wheel hub 5. It is rounded for this purpose. In the position shown in FIG. 2, in which casing tube switch module 10 is mounted on casing tube 2, the flared section of clamping tongue 15 is pretensioned, so that clamping areas 16, 17 clamp bracket 11, and thus the entire casing tube switch module 10, against casing tube 2. The stiffness of clamping tongue 15, which is a consequence of its curvature in the circumferential direction, is desired, because it increases the clamping force between the two elements: casing tube 2 and bracket 11.

When the steering wheel is mounted, casing tube switch module 10 with its bracket 11 is put into the position shown in FIG. 2, in which it is mounted and clamped with casing tube 2. When the steering wheel is mounted, steering wheel hub 5 makes an axial motion toward casing tube 2. This axial motion, which is necessary to mount the steering wheel, is transferred through bearing 9 onto bracket 11 of casing tube switch module 10, which lies against stator side 18 of bearing 9 for this purpose. Thus, when the steering wheel is mounted, the axial mounting motion is transferred to bracket 11 of casing tube switch module 10, whose inside rounded edge on the end pointing away from steering wheel hub 5 comes to lie against the outside of the flared sections of clamping tongues 15, 15', and these move away toward the surface of casing tube 2. This motion pretensions clamping tongues 15, 15' because they are supported through clamping areas 16, 17.

Clamping part 13 is prevented from making an equal axial movement by stop flange 14, which lies against the face of casing tube 2 that points toward steering wheel hub 5. The clamping force that is induced in this way in clamping tongues 15, 15' acts in the radial direction, so that this effective clamping securely fastens bracket 11 and thus the entire casing tube switch module 10 to casing tube 2, both in the axial and in the radial directions.

Casing tube switch module 10 is disassembled in the opposite way, which involves first removing the steering wheel from steering shaft 3 and then pulling casing tube switch module 10 with its bracket 11 off of clamping part 13 in the axial direction. To assist such a disassembly movement, and thus to assist the loosening of the clamping that was caused between bracket 11 and clamping part 13, there is a return spring 19, one end of which is supported against a ring-shaped flange-like shoulder 20 of clamping part 13, and the other end of which is supported against bracket 11. The return spring is pretensioned during the assembly operation, so that when the steering wheel is loosened it is easier to pull casing tube switch module 10 off of casing tube 2 or clamping part 13.

A further development of the sample embodiment shown in the Figures is also to provide protection against twisting between casing tube switch module 10 and casing tube 2. To accomplish this, at least one of clamping element's 13 clamping tongues 15, 15' is located radially outside of a recess made in the outside of casing tube 2 before the fixing of casing tube switch module 10. When the tensioning motion is made, the clamping tongue 15, 15' is pressed into this recess, whose width corresponds essentially to the width of the clamping tongue. The engagement of the clamping tongue 15, 15' into the recess provides effective protection from twisting.

Instead of pressing in parts of the clamping tongue, it is also possible for protection from twisting to be provided by such a clamping tongue having a radially projecting bulge which engages into a corresponding recess in the casing tube when the axial movement is made. The recesses in the casing tube have a certain axial extent; however, their width corresponds essentially to the width of the element to be put into the recess.

LIST OF REFERENCE NUMBERS

1 Steering column module
2 Casing tube
3 Steering shaft
4 Steering wheel bolt
5 Steering wheel hub
6 Contact coil cassette
7 Mounting sleeve
8 Rotor side
9 Bearing
10 Casing tube switch module
11 Bracket
12 Receptacle
13 Clamping part
14 Stop flange
15, 15' Clamping tongue
16 Clamping area
17 Clamping area
18 Stator side
19 Return spring
20 Shoulder

What is claimed is:

1. A device for fastening a casing tube switch module to a casing tube of a steering wheel shaft when a steering wheel is mounted on the steering wheel shaft, the device comprising:
   a clamping element arranged coaxially between the casing tube and the casing tube switch module, the clamping element operable for exerting a clamping force in a direction extending radially out from the steering wheel shaft when tensioned; and
   a bearing operable for rotationally decoupling the steering wheel from the casing tube switch module, the bearing having a stator side operable for transferring an axial motion of the steering wheel as the steering wheel is mounted on the steering wheel shaft to the casing tube switch module such that the casing tube switch module moves axially with respect to the casing tube and the clamping element and tensions the clamping element to apply the clamping force in a direction extending radially out from the casing tube and radially toward the casing tube switch module in order to fasten the casing tube switch module to the casing tube.

2. The device of claim 1 wherein:
   the clamping element includes a sleeve-shaped clamping part arranged to be concentric to the casing tube and which has at least two clamping tongues.

3. The device of claim 2 wherein:
   at least one section of the clamping tongues is flared in the direction extending radially out from the steering wheel shaft.

4. The device of claim 1 wherein:
   the clamping element has, at an end pointing toward the steering wheel, a stop flange which projects radially inward toward the steering wheel shaft and with which the clamping element is supported against a face of the casing tube pointing towards the steering wheel.

5. The device of claim 1 further comprising:
   a return spring arranged to provide a force that counteracts the relative axial motion between the casing tube switch module and the clamping element.

6. The device of claim 5 wherein:
   the clamping element includes a ring-shaped shoulder against which the return spring is supported.

7. The device of claim 1 wherein:
   on a front end of the casing tube switch module in the direction away from the steering wheel the inner edge of the casing tube switch module is rounded in the direction toward the casing tube.

8. A device for fastening a casing tube switch module to a casing tube of a steering wheel shaft when a steering wheel is mounted on the steering wheel shaft, the device comprising:
   a clamping element arranged coaxially between the casing tube and the casing tube switch module, the clamping element operable for exerting a clamping force in a direction extending radially out from the steering wheel shaft;

a bearing operable for rotationally decoupling the steering wheel from the casing tube switch module, the bearing having a stator side operable for transferring an axial motion of the steering wheel as the steering wheel is mounted on the steering wheel shaft to the casing tube switch module such that the casing tube switch module moves axially with respect to the casing tube toward the clamping element and tensions the clamping element to apply the clamping force in order to fasten the casing tube switch module to the casing tube; and a return spring arranged to provide a force that counteracts the relative axial motion between the casing tube switch module and the clamping element.

9. The device of claim 8 wherein:

the clamping element includes a sleeve-shaped clamping part arranged to be concentric to the casing tube and which has at least two clamping tongues.

10. The device of claim 9 wherein:

at least one section of the clamping tongues is flared in the direction extending radially out from the steering wheel shaft.

11. The device of claim 8 wherein:

the clamping element has, at an end pointing toward the steering wheel, a stop flange which projects radially inward toward the steering wheel shaft and with which the clamping element is supported against a face of the casing tube pointing towards the steering wheel.

12. The device of claim 8 wherein:

the clamping element includes a ring-shaped shoulder against which the return spring is supported.

13. The device of claim 8 wherein:

on a front end of the casing tube switch module in the direction away from the steering wheel the inner edge of the casing tube switch module is rounded in the direction toward the casing tube.

* * * * *